United States Patent [19]
Watson et al.

[11] Patent Number: 5,656,067
[45] Date of Patent: Aug. 12, 1997

[54] VSA ADSORPTION PROCESS WITH ENERGY RECOVERY

[75] Inventors: Charles Franklin Watson, Orefield; Rakesh Agrawal, Emmaus; Paul Anthony Webley; Joseph Gerard Wehrman, both of Macungie, all of Pa.

[73] Assignee: Air Products and Chemicals, Inc., Allentown, Pa.

[21] Appl. No.: 606,137

[22] Filed: Feb. 23, 1996

[51] Int. Cl.⁶ .................................. B01D 53/053
[52] U.S. Cl. ..................... 95/101; 95/102; 95/103; 95/105; 95/117; 95/130; 95/139
[58] Field of Search ............... 95/96–105, 117, 95/121, 122, 130, 139

[56] References Cited

U.S. PATENT DOCUMENTS

| | | | |
|---|---|---|---|
| 3,430,418 | 3/1969 | Wagner | 55/25 |
| 3,498,025 | 3/1970 | Bednarski | 95/102 |
| 3,720,042 | 3/1973 | Simonet | 95/103 |
| 4,449,990 | 5/1984 | Tedford, Jr. | 95/102 X |
| 4,589,888 | 5/1986 | Hiscock et al. | 55/26 |
| 4,614,525 | 9/1986 | Reiss | 95/96 |
| 4,650,501 | 3/1987 | Hiscock et al. | 55/26 |
| 4,732,578 | 3/1988 | Veltman et al. | 95/96 |
| 4,778,670 | 10/1988 | Pinto | 95/96 X |
| 4,781,735 | 11/1988 | Tagawa et al. | 55/26 |
| 4,793,832 | 12/1988 | Veltman et al. | 95/96 X |
| 4,810,265 | 3/1989 | Lagree et al. | 95/101 |
| 4,892,565 | 1/1990 | Schmidt et al. | 95/101 |
| 4,917,710 | 4/1990 | Haruna et al. | 55/26 |
| 4,981,499 | 1/1991 | Hay et al. | 55/26 |
| 5,015,271 | 5/1991 | Reiss | 55/25 |
| 5,084,075 | 1/1992 | Sircar | 95/103 X |
| 5,122,164 | 6/1992 | Hirooka et al. | 55/26 |
| 5,213,593 | 5/1993 | White, Jr. | 95/99 |
| 5,223,004 | 6/1993 | Eteve et al. | 55/26 |
| 5,246,676 | 9/1993 | Hay | 423/219 |
| 5,256,172 | 10/1993 | Keefer | 95/103 X |
| 5,298,054 | 3/1994 | Malik | 95/104 X |
| 5,330,561 | 7/1994 | Kumar et al. | 95/101 |
| 5,393,326 | 2/1995 | Engler et al. | 95/103 |
| 5,403,384 | 4/1995 | Faul et al. | 95/96 |
| 5,411,578 | 5/1995 | Watson et al. | 95/101 |
| 5,429,666 | 7/1995 | Agrawal et al. | 95/101 |
| 5,529,611 | 6/1996 | Monereau et al. | 95/101 |
| 5,540,758 | 7/1996 | Agrawal et al. | 95/101 |
| 5,549,733 | 8/1996 | Marot et al. | 95/101 X |

FOREIGN PATENT DOCUMENTS 0354259   2/1990   European Pat. Off. .

*Primary Examiner*—Robert Spitzer
*Attorney, Agent, or Firm*—Geoffrey L. Chase

[57] ABSTRACT

A vacuum swing adsorption process for separating a feed gas mixture into a more strongly adsorbable component and a less strongly adsorbable component in a process employing two vacuum pumps and three adsorbent beds containing an adsorbent selective for the more strongly adsorbable component using countercurrent depressurization and cocurrent ambient feed repressurization simultaneous with product end to product end pressure equalization and a common-shaft machinery arrangement which allows the expansion energy contained in the countercurrent depressurization and cocurrent ambient feed repressurization streams to be recovered and utilized to reduce overall process power consumption. Addition of three valves and an expander element will also allow expansion energy in the product purge and pressure equalization streams to be recovered. Oxygen product can be recovered from air at low cost using the process.

18 Claims, 1 Drawing Sheet

VSA ADSORPTION PROCESS WITH ENERGY RECOVERY

TECHNICAL FIELD OF THE INVENTION

The present invention is directed to a vacuum swing adsorption process for the separation of a more strongly adsorbable component from a less strongly adsorbable component in a gas mixture with high recovery of the less strongly adsorbable component at approximately feed pressure. More specifically, the present invention is a vacuum swing adsorption process for the separation of air to recover oxygen as a relatively unadsorbed product at high recovery and approximately feed pressure, using overlapping evacuation steps and various techniques for recovering the pressure energy contained within the process gas streams.

BACKGROUND OF THE PRIOR ART

Oxygen is a commodity chemical in the industrial gas industry. It has numerous applications including waste water treatment, pulp bleaching, glass manufacturing, and steel manufacturing. One of the most common methods of oxygen production is by adsorptive gas separation. However, this technology is not competitive for large size oxygen plants (>90 TPD $O_2$). The technology of choice for this size range is cryogenic distillation of air. There is a need in the marketplace to produce oxygen in quantities >90 TPD at low capital and energy costs by adsorptive gas separation.

There are two major categories of adsorptive oxygen production processes—pressure swing adsorption processes (PSA) and vacuum swing adsorption processes (VSA). The pressure swing adsorption processes carry out the adsorption (feed) step at pressures much higher than ambient and adsorbent regeneration at pressures close to ambient. The adsorbent beds go through secondary process steps, such as pressure equalizations, depressurizations, blowdowns, and purge or various combinations of these during the cycle. Typical of the $O_2$ PSA processes are U.S. Pat. Nos. 3,430,418; 4,589,888; 4,650,501; and 4,981,499.

These processes tend to be energy intensive and more suitable for smaller oxygen plants producing less than 20 tons of oxygen per day and preferably less than 5 tons of oxygen per day. A subset of $O_2$ PSA processes is a rapid pressure swing adsorption (RPSA) process. As the name implies, this process involves similar steps as a PSA process, but carries out these steps very quickly. Again, this process tends to be energy intensive and suitable for oxygen plants even smaller than $O_2$ PSA's.

Primary reasons for high energy consumption in PSA processes are: (1) $O_2$ recovery from these processes is low, and (2) the entire feed stream has to be compressed up to the adsorption pressure. These inefficiencies are somewhat circumvented in vacuum swing adsorption (VSA) processes. In these processes, adsorption is carried out at pressure slightly above ambient and adsorbent regeneration is carried out at sub-atmospheric levels. The adsorbent beds go through several secondary steps with the primary aim of increasing oxygen recovery and reducing adsorbent inventory per unit of product gas. Most commercial $O_2$ VSA processes employ two or three adsorbers, a feed blower, vacuum blower, and possibly a product surge tank.

U.S. Pat. No. 4,917,710 describes a two bed $O_2$ VSA process with a product storage vessel. Process cycle steps are: adsorption, cocurrent depressurization, simultaneous cocurrent depressurization and evacuation, evacuation, vacuum purge by product, vacuum purge by gas obtained in a cocurrent depressurization step, simultaneous pressure equalization and product repressurization, and simultaneous feed and product repressurization. Gas for product repressurization and product purge is obtained from the product storage vessel. Gas for pressure equalization is obtained from the bed on simultaneous cocurrent depressurization and evacuation step.

U.S. Pat. No. 4,781,735 describes a three bed $O_2$ VSA process with steps: adsorption, feed to feed or dual end pressure equalization, cocurrent depressurization, evacuation, vacuum purge by gas obtained in cocurrent depressurization step, product repressurization from bed on feed step, simultaneous feed repressurization and feed to feed or dual end pressure equalization.

European patent application 0 354 259 outlines various options for a two bed $O_2$ VSA process: adsorption, cocurrent depressurization, evacuation, pressure equalization with gas obtained in cocurrent depressurization step and feed repressurization. An option includes vacuum purge by product gas from the bed on adsorption step.

U.S. Pat. No. 5,015,271 describes an $O_2$ VSA process with the steps: adsorption, simultaneous cocurrent depressurization and countercurrent evacuation or feed, countercurrent evacuation, simultaneous product to product pressure equalization and feed repressurization, or vacuum purge, simultaneous feed and product repressurization and feed repressurization.

U.S. Pat. No. 5,122,164 describes an $O_2$ VSA process with the steps: adsorption, simultaneous cocurrent depressurization and countercurrent evacuation, countercurrent evacuation, vacuum purge, pressure equalization with gas from a bed undergoing cocurrent depressurization and product repressurization.

U.S. Pat. No. 5,223,004 describes an $O_2$ VSA process with the steps: adsorption, simultaneous cocurrent depressurization and countercurrent evacuation, countercurrent evacuation, purge, repressurization with product and cocurrent depressurization gas from another bed and repressurization with product and feed.

U.S. Pat. No. 5,429,666 describes a 2 bed $O_2$ VSA process with the steps: adsorption, simultaneous cocurrent depressurization and countercurrent evacuation, countercurrent evacuation, purge, simultaneous repressurization with feed gas mixture and cocurrent depressurization gas, and repressurization with several combinations of feed gas, product gas, and ambient air.

The above described processes are ideal for producing up to 90 TPD $O_2$ from a single plant. There is an incentive to search for alternative processes for plant sizes greater than 90 TPD due to the following two factors:

1. Maximum vacuum pump size. The positive displacement Roots type blowers, which are typically employed in this application, have a maximum size of 30,000 ACFM. This is sufficient to produce up to 90 TPD $O_2$. Beyond that, two vacuum pumps are required.

2. Adsorber size. Typical $O_2$ VSA processes achieve an adsorbent productivity of 1.0 to 1.5 TPD of $O_2$ production per ton of adsorbent. At this productivity level, the maximum production which can be achieved from two or three 15 foot diameter adsorbers is 60 to 90 TPD. Adsorbent productivity is a function of the quantity of $O_2$ produced per cycle and the length of time (T) required to complete each cycle. For a plant with a single vacuum pump, the minimum value of T is n times E, where n is the number of adsorbers and E is minimum practical evacuation time. E is typically 40 to 45 seconds and T is typically 80 to 90 seconds for a 2 bed process, 120 to 135 seconds for a 3 bed process.

The previously described O$_2$ VSA processes are more economic than cryogenic technology, up to 90 TPD. Beyond 90 TPD, the advantage of O$_2$ VSA declines. The reasons for this are two-fold:

1. Beyond 90 TPD, two parallel VSA plants of the type described above are required. The cost is essentially double that of a single plant. By contrast, the cost multiplier for a double size cryogenic plant is 1.5 times.
2. Unit power consumption of the cryogenic plant drops as the plant size increases, as more efficient compressors are employed, and opportunities for heat integration and power recovery are exploited. Unit power of the parallel VSAs typically does not drop, despite significant opportunities in the process for energy optimization. Table 1 summarizes the results of an exergy analysis on the two-bed process described in U.S. Pat. No. 5,429,666.

TABLE 1

Lost Work Distribution

| | |
|---|---|
| Cycle/Sieve/Beds | 34% |
| Vacuum Blower | 32% |
| Feed Blower | 18% |
| Waste Stream | 7% |
| Vacuum Line, DP, DT | 6% |
| Feed Line, DP, DT | 3% |

The theoretical work of separation represents only 15% of the total power consumption. Vacuum and feed blower inefficiencies contribute half the lost work in the system. Lost expansion energy contributes another 33%.

Several processes employing two integrated vacuum pumps and four or more adsorbers have been proposed to overcome the 90 TPD single train limitation. U.S. Pat. No. 5,393,326 describes an oxygen VSA process which incorporates two stages of evacuation. Each stage is carried out by a separate vacuum machine. These machines could be of the same type or different types, e.g. volumetric and centrifugal.

U.S. Pat. No. 5,330,561 describes a 4 bed O$_2$ VSA process with 2 vacuum pumps with the steps: adsorption, cocurrent depressurization to provide purge gas, simultaneous countercurrent evacuation and cocurrent depressurization to provide pressure equalization gas, countercurrent evacuation in two successive pumping sub-steps, countercurrent purge, receipt of aforementioned pressure equalization gas and repressurization with several combinations of product gas, feed gas, or ambient air.

U.S. Pat. No. 5,411,578 describes a 4 bed O$_2$ VSA process with 2 vacuum pumps with the steps: adsorption, cocurrent depressurization to provide product gas, cocurrent depressurization to provide purge gas, two successive sub-steps of countercurrent evacuation, countercurrent purge, partial repressurization with product gas, followed by further repressurization with feed gas. Options include simultaneous cocurrent depressurization to provide pressure equalization gas following the provide purge step and simultaneous ambient air repressurization during the partial product repressurization step.

U.S. Pat. No. 5,246,676 describes a process for producing oxygen from air containing at least three beds and undergoing the following steps: adsorption, countercurrent evacuation including at least two successive pumping sub-steps, and product repressurization. Various options on the cycle include: cocurrent depressurization to provide purge gas to the bed under vacuum, further cocurrent depressurization to provide partial repressurization gas, and cocurrent depressurization to a storage tank from where some of the purge gas is withdrawn.

The above described dual vacuum cycles have the capability to increase single train capacity beyond 90 TPD and to reduce power consumption by allowing more time for the evacuation phase and by allowing more efficient machines to be used in the deep vacuum region. They do not, however, offer any significant improvement in adsorbent productivity relative to the 2 or 3 bed cycles.

There is clearly a need in the market place for an O$_2$ VSA process which extends the size range of a single skid beyond 90 TPD, which substantially increases adsorbent productivity, and which integrates the machinery with the internal process flows to reduce wasted power. The present invention outlines such a process.

BRIEF SUMMARY OF THE INVENTION

The present invention is a VSA process for selectively separating a more strongly adsorbable component from a less strongly adsorbable component of a feed gas mixture, in a plurality of adsorption beds containing an adsorbent selective for the more strongly adsorbable component, utilizing two vacuum pumps, and comprising the steps of:

(a) introducing a feed gas mixture at elevated pressure containing the more strongly adsorbable component and the less strongly adsorbable component into an inlet of a first adsorption bed containing the adsorbent selective for the more strongly adsorbable component and adsorbing the more strongly adsorbable component on the adsorbent while the less strongly adsorbable component passes through the first bed unadsorbed as a product and as a source of purge gas for a bed of said plurality of adsorption beds undergoing purge of step (e) and continuing until the adsorption front of the more strongly adsorbable component approaches an outlet of the first bed and terminating the introduction of the feed gas mixture;

(b) following the termination of the introduction of the feed gas mixture into the first bed, cocurrently depressurizing the first bed to an intermediate pressure to remove a cocurrent depressurization gas to an outlet of a bed of the plurality of adsorption beds at lower pressure undergoing repressurizing of step (f) to at least partially pressure equalize the two beds, while countercurrently depressurizing the first bed by expanding elevated pressure gas in the first adsorption bed through a first vacuum pump to recover energy from the gas to reduce the power requirement for an adsorber undergoing the countercurrent evacuation of step (d);

(c) countercurrently evacuating the first bed through the first vacuum pump to remove a portion of the more strongly adsorbable component;

(d) continuing to evacuate the first bed through a second vacuum pump to remove an additional portion of the more strongly adsorbable component;

(e) countercurrently purging the first bed with a portion of the less strongly adsorbable component from a bed of the plurality of adsorption beds undergoing step (a) to remove the final portion of the more strongly adsorbable component from the first bed;

(f) repressurizing the first bed with the cocurrent depressurization gas from a bed of the plurality of adsorption beds undergoing the cocurrent ;depressurization of step (b), and with ambient pressure feed gas mixture which expands through a feed gas blower before entering the first adsorption bed wherein the energy recovered is used to additionally reduce the power requirement for the countercurrent evacuation of step (d).

(g) further repressurizing the first bed with elevated pressure feed gas mixture; and (h) performing steps (a) through (g) in each of the plurality of adsorption beds in a phased sequence.

Alternatively, the bed is simultaneously repressurized with less strongly adsorbable component and feed gas mixture in step (g).

Preferably, the pressure equalization of step (b) is performed to complete equalization of the pressures in the two beds engaged in the pressure equalizing step.

Preferably, both vacuum trains and the air blower are mounted on the same motor shaft to simplify the transmission of recovered power.

Preferably, the air blower is a positive displacement Roots type blower.

Preferably, the first vacuum pump is a single stage positive displacement Roots type blower.

Preferably, the second vacuum pump is a two stage, water injected positive displacement Roots type blower, or a centrifugal type machine.

Alternatively, the purge gas is expanded through an expander to recover the pressure energy contained there in and use it to reduce the power requirement of the countercurrent purge of step (e).

Further alternatively, the cocurrent depressurization gas of step (b) is expanded through an expander to recover energy to further reduce the power requirement of the countercurrent evacuation of step (d).

Preferably, the feed gas mixture is air, the more strongly adsorbable component is nitrogen and the less strongly adsorbable component is oxygen.

Most preferably, the process is carried out in three adsorbers.

The present invention is further a process for selectively separating nitrogen from oxygen in air, utilizing two vacuum pumps and three adsorption beds containing an adsorbent selective for nitrogen, comprising the steps of:

(a) introducing feed air at elevated pressure into an inlet of a first adsorption bed containing an adsorbent selective for nitrogen and adsorbing nitrogen on the adsorbent while oxygen passes through the first bed unadsorbed as a product and as a source of purge gas for a second bed undergoing the purge of step (e), until the adsorption front of nitrogen approaches an outlet of the first bed and terminating the introduction of air into the first bed;

(b) following the termination of the introduction of air into the first bed, cocurrently depressurizing the first bed to remove a cocurrent depressurization gas from the first bed and passing the cocurrent depressurization gas to the outlet of a second bed at lower pressure undergoing repressurizing of step (f) to at least partially pressure equalize the first bed and the second bed, while countercurrently depressurizing the first bed by expanding the elevated pressure nitrogen in the first adsorption bed to recover energy from the nitrogen to reduce the power requirement of the countercurrent evacuation of step (d);

(c) countercurrently evacuating the first bed through the first vacuum pump to remove a portion of the nitrogen from the first bed;

(d) continuing to evacuate the first bed through the second vacuum pump to remove an additional portion of the nitrogen;

(e) countercurrently purging the first bed with oxygen from a second bed undergoing step (a) to remove a final portion of the nitrogen from the first bed;

(f) repressurizing the first bed with cocurrent depressurization gas from a second bed at higher pressure undergoing the cocurrent depressurization of step (b) and with ambient pressure feed which expands through a feed gas blower before entering the first adsorption bed wherein the energy recovered is used to additionally reduce the power requirement of the countercurrent evacuation of step (d);

(g) further repressurizing the first bed with elevated pressure feed air; and (h) performing steps (a) through (g) in each of the two adsorption beds in a phased sequence.

Alternatively, the first bed is repressurized in step (g) with oxygen product and elevated pressure feed air simultaneously.

Preferably, the feed air is at a pressure in the range of approximately 15–30 psia.

More preferably, the feed air is at a pressure in the range of approximately 15–24 psia.

DETAILED DESCRIPTION OF THE INVENTION

Figure 1:
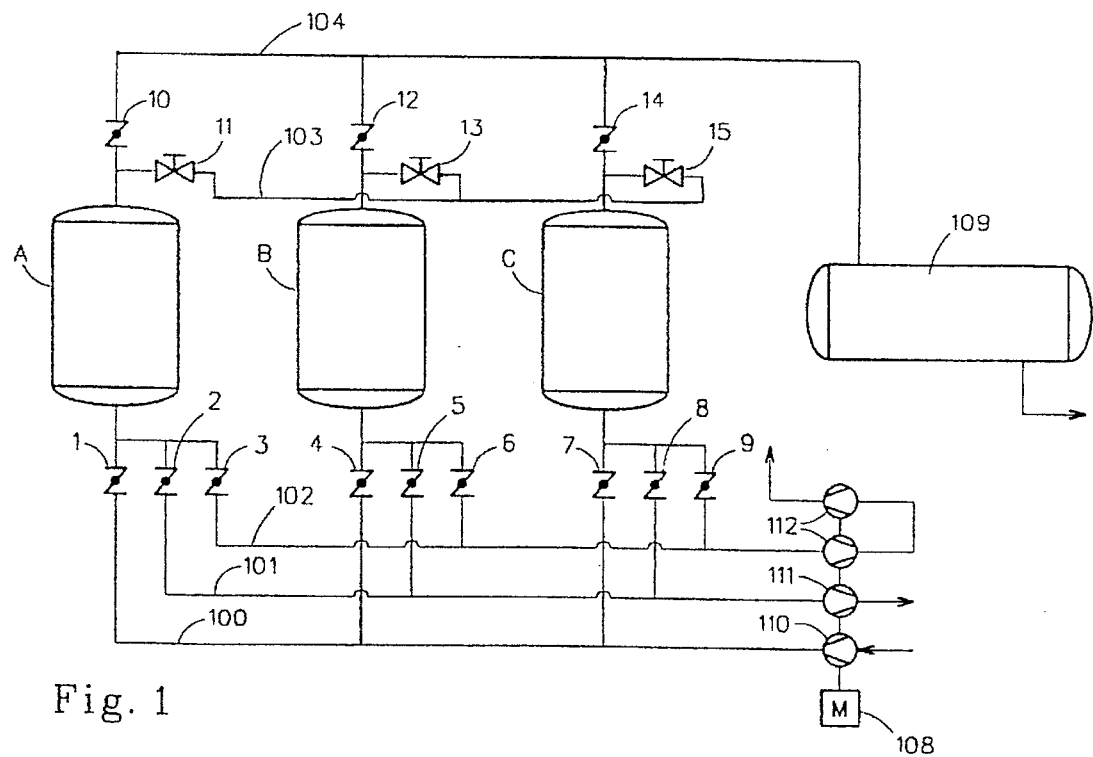
FIG. 1 is a schematic drawing of the first preferred embodiment of the present invention using three parallel adsorption beds, two vacuum pumps, and appropriate valve manifolding for feed, evacuation, purge, equalization, and repressurization. It permits recovery of the pressure energy contained in the countercurrent depressurization and ambient air repressurization streams.

The present invention will now be described with regard to both preferred embodiments.

Both preferred embodiments have the following steps:

1. Adsorption (A) to provide product and purge gas,
2. Cocurrent depressurization (PPE) to provide pressure equalization gas and simultaneous initiation of countercurrent depressurization (DP) with recovery of the expansion energy, resulting from DP gas expanding through the first vacuum pump to the atmosphere,
3. Countercurrent evacuation through first vacuum train (E1),
4. Countercurrent evacuation through second vacuum train (E2),
5. Countercurrent purge (PU) with product from (A),
6. Pressure equalization (RPE) with cocurrent depressurization gas from (PPE) and repressurization with ambient pressure feed gas (ARP) with recovery of expansion energy resulting from ambient feed gas expanding through the feed gas blower into the subatmospheric pressure environment of adsorber,
7. Feed repressurization (RP) with elevated pressure feed gas, possibly in combination with product gas.

A process cycle chart is outlined in Table 2.

TABLE 2

Three Bed O$_2$ VSA with Power Recovery

| Bed# |     |         |    |         |     |         |    |
|------|-----|---------|----|---------|-----|---------|-----|
| A    | A   | PPE/DP  | E1 | E2      | Pu  | RPE/ARP | RP  |
| B    | Pu  | RPE/ARP | RP | A       | PPE/DP | E1   | E2  |
| C    | E1  | E2      | Pu | RPE/ARP | RP  | A       | PPE/DP | E1 |

| | |
|---|---|
| A | Adsorption to produce product (Feed gas mixture) |
| PPE/DP | Cocurrent Depressurization to provide Pressure Equalization gas and simultaneous Countercurrent Depressurization |
| E1 | Countercurrent Evacuation by first vacuum pump |
| E2 | Countercurrent Evacuaton by second vacuum pump |
| PU | Countercurrent Vacuum Purge with Product |
| RPE/ARP | Pressure Equalization with Cocurrent Depressurization gas and repressurization with Ambient Feed Gas Mixture |
| RP | Repressurization with Elevated Pressure Feed Gas Mixture and optionally with product gas. |

Process steps for the preferred embodiment will now be described in detail:

1. Adsorption Step (A), which comprises:
   Flowing the elevated feed gas mixture, exemplified by air at a pressure of 15–30 psia through a bed packed with one or more adsorbents capable of selectively adsorbing water, carbon dioxide, and nitrogen from air.
   Withdrawing an effluent stream consisting of O$_2$ product at feed pressure. Part of this stream is used as purge gas for bed on step 5 and the remainder constitutes oxygen product.
   c. Continuing steps 1(a) and 1(b) for a predetermined time or until the concentration of nitrogen impurity in the effluent stream reaches a preset limit. The bed is now called "spent" because it has exhausted its capacity for removing nitrogen from feed gas.

2. Cocurrent and Countercurrent Depressurization Step (PPE/DP), which comprises:
   a. Discontinuing the feed flow through the spent bed and transferring the feed to another VSA bed.
   b. Reducing the pressure in the spent VSA bed from the adsorption pressure level to some "intermediate" level (10–15 psia) by connecting the product end of this bed with the product end of the VSA bed on step 6 of its cycle while simultaneously initiating countercurrent depressurization of the spent VSA bed through the first vacuum pump.
   The countercurrent depressurization gas is at a super atmospheric pressure initially, and the energy that is released as it expands through the first vacuum pump to the atmosphere is recovered and used to reduce the power consumption of the second vacuum pump. In the second preferred embodiment, expansion energy contained in the cocurrent depressurization stream is recovered using an expander, and used to further reduce power consumption of the second vacuum pump.
   c. Discontinuing the above step when the pressure in the spent VSA bed has reached the predetermined intermediate pressure level.

3. Countercurrent Evacuation Step (E1), which comprises:
   a. Further reducing the pressure in the spent bed from intermediate level to a "lower" level (6.0–10.0 psia) by connecting the feed end of the spent VSA bed with the first vacuum pump.
   b. Continuing the above step until the pressure in the VSA bed has reached the predetermined lower pressure level.

4. Countercurrent Evacuation Step (E2), which comprises:
   a. Further reducing the pressure in the spent bed from lower level to the "lowest" level (1.0–6.0 psia) by connecting the feed end of the spent VSA bed with the second vacuum pump.
   b. Continuing the above step until the pressure in the VSA bed has reached the predetermined lowest pressure level.

5. Countercurrent Purge Step (PU), which consists of:
   a. Continuing evacuation of the VSA bed from the feed end using the second vacuum pump.
   b. Connecting the product end of this bed with the product end of another VSA bed on step 1 of its cycle. Alternatively, purge gas could be obtained from a product surge tank, if such tank is used. In the second preferred embodiment the purge gas flows through an expander, to recover its pressure energy and reduce power consumption of the second vacuum pump.
   c. Continuing the above steps until pressure in this bed has reached a "low" level (1–10 psia).

6. Pressure Equalization and Ambient Repressurization Step (RPE/ARP), which consists of:
   a. Discontinuing evacuation of the above bed and start evacuating another VSA bed. This bed is now call "regenerated" since its capacity for more strongly adsorbed components, such as N$_2$, H$_2$O, and CO$_2$ removal from air has been restored.
   b. Connecting the product end of the regenerated bed with the product end of the bed on step 2 of its cycle and connecting the feed end of the bed to the feed gas blower. Ambient air expands through the feed gas blower before entering the subambient pressure adsorber. Energy from this expansion is recovered and used to reduce the power consumption of the second vacuum pump.
   c. Continuing the above step for a predetermined time or until pressure in the regenerated bed has reached the predetermined intermediate level. At the end of RPE/ARP, the pressure difference between the two beds is generally less than 2 psia, and preferably less than 1 psia.

7. Repressurization Step, which consists of:
   a. Discontinuing the pressure equalization of regenerated bed.
      A. Repressurization (RP), which consists of:
         i) Connecting the feed end of the pressure equalized regenerated bed with the elevated pressure feed gas mixture.
         ii) Continuing the above step until pressure in the regenerated bed is close to or equal to the predetermined adsorption pressure.
      or
      B. Simultaneous Product and Feed Repressurization Step (PRP/FRP), which consists of:
         Connecting the product end of the regenerated bed with the product reservoir and opening the feed end of the regenerated bed to the feed blower.
         ii) Continuing the above step until the pressure in the regenerated bed is equal to the predetermined adsorption pressure.

Flow schematic and hardware will be somewhat different for each of the preferred embodiments of the present invention. FIG. 1 depicts a schematic for the first preferred embodiment with recovery of expansion energy from the countercurrent depressurization stream of step (2) and the ambient air repressurization stream of step (6). Table 3 outlines the corresponding valve sequence for a typical cycle time. Detailed process description of the cycle at typical operating conditions for the process option described in FIG. 1 and Tables 2 and 3 is given below:

TABLE 3

Valve Sequence: 3 Bed O₂ VSA - Embodiment #1

| Time (sec) | Valve No. | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| 1–10 | o | | | | | o | | o | | o | o | | o | | |
| 10–15 | | o | | o | | | | | o | | o | | o | | |
| 15–20 | | o | | o | | | | | o | | | | | | |
| 20–30 | | o | | o | | | | | o | | | o | o | | o |
| 30–35 | | | o | | o | | o | | | | | | o | | o |
| 35–40 | | | o | | o | | o | | | | | | | | |
| 40–50 | | | o | | o | | o | | | | o | | | o | o |
| 50–55 | o | | | | | o | o | | | | o | | | | o |
| 55–60 | o | | | | | o | o | | | | | | | | | o = open, otherwise closed

Ambient air compressed to feed pressure (21 psia) by a feed blower 110 driven by motor 108 comprises the elevated feed gas mixture and enters through manifold 100 and open valve 1 into first Bed A, which has already been pressurized to adsorption pressure. Beds A, B and C are packed with adsorbent(s) selective for the removal of water, carbon dioxide, and nitrogen from air. Oxygen product is withdrawn via open valve 10 and manifold 104 to product reservoir 109. Part of the product oxygen is removed through manifold 103 and open valves 11 and 13 as purge gas for Bed B. Feed flow is discontinued after a predetermined time or as soon as nitrogen concentration in the effluent from Bed A reaches a preset limit or the adsorption front approaches the bed outlet. Pressure in Bed A is reduced to ~15 psia by closing valves 1 and 10 and opening valves 11 and 13 and connecting Bed A with Bed B via manifold 103. Bed A is simultaneously depressured via open valve 2 and manifold 101 through vacuum pump 111. The energy recovered from this expanding stream is used to reduce the power requirement of vacuum pump 112. Valve 11 is then closed and valve 2 remains opened until Bed A reaches an evacuation level pressure ~7 psia. Valve 2 then closes and Bed A continues evacuating to ~4 psia via open valve 3 and manifold 102 through vacuum pump 112. Valve 3 is kept open for a predetermined time while valve 11 is opened to vacuum purge Bed A through manifold 103 with product oxygen from Bed C via open valve 15. Valve 3 is then closed and valves 1, 11, and 15 are opened for simultaneous ambient feed air and Bed C cocurrent depressurization gas repressurization through manifolds 100 and 103, respectively. The energy recovered from the ambient feed air as it expands through the feed blower before entering the subatmospheric pressure of the adsorber, is used to reduce the power requirement for vacuum pump 112. Valves 11 and 15 are kept open until the pressures in Beds A and C equalize. Then valves 11 and 15 close and Bed A is pressurized up to adsorption pressure ~21 psia with elevated pressure feed air from manifold 100. Valve 10 is opened to remove product oxygen through manifold 104. Bed A is now ready to start a new cycle. All three beds go through a similar sequence of operation 120 degrees out of phase with each other, in which the operation of Bed B associated with valves 4, 5, 6, 12 and 13 and Bed C associated with valves 7, 8, 9, 14 and 15 is comparable to the operation described for Bed A. The feed blower 110 and the vacuum pumps 111 and 112 run continuously off the same motor shaft, allowing simplification of operation and transmission of recovered power.

Figure 2:
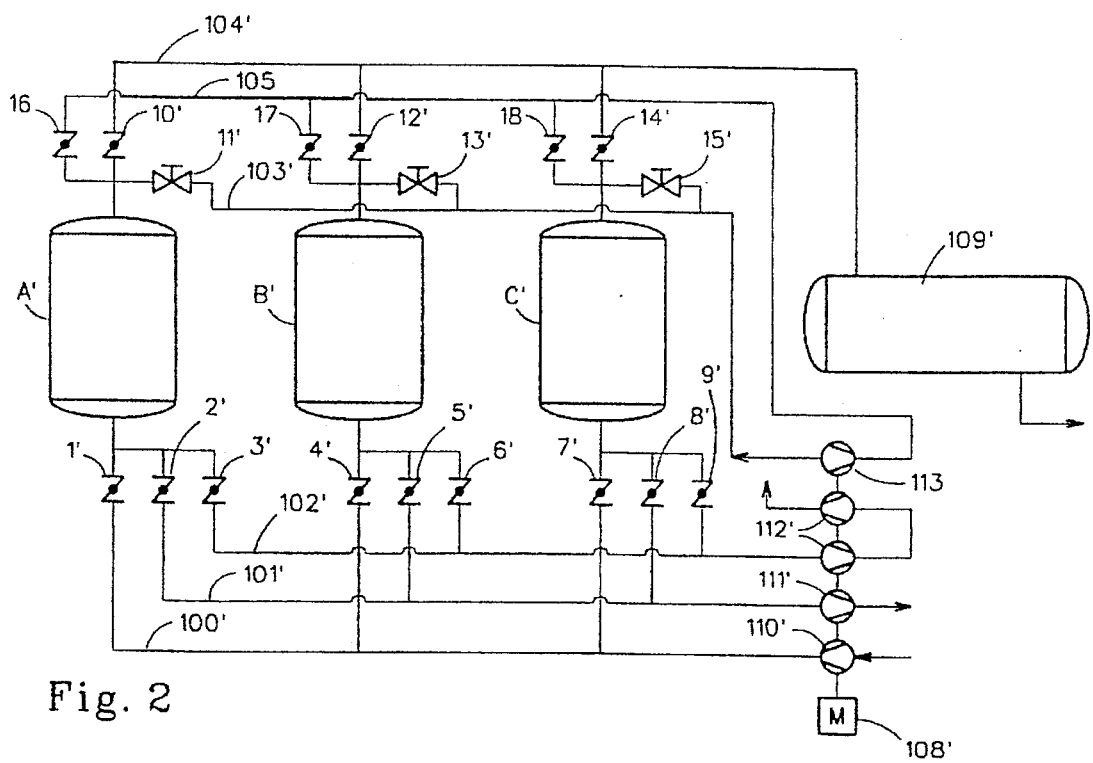
FIG. 2 is a schematic drawing of a second preferred embodiment of the present invention using three adsorption beds, two vacuum pumps, an expander, and appropriate valve manifolding. It permits additional recovery of the pressure energy contained in the concurrent depressurization/pressure equalization and product purge streams.

FIG. 2 depicts a schematic for the second preferred embodiment. It permits additional recovery of expansion energy from the cocurrent pressure equalization stream of step (2) and the product purge stream of step (5). Table 4 outlines the corresponding valve sequence for a typical cycle time. Detailed process description of the cycle at typical operating conditions for the process option described in FIG. 2 and Tables 2 and 4 is given below:

TABLE 4

Valve Sequence: 3 Bed O₂ VSA - Embodiment #2

| Time (sec) | Valve No. | | | | | | | | | | | | | | | | | |
|---|---|---|---|---|---|---|---|---|---|---|---|---|---|---|---|---|---|---|
| | 1' | 2' | 3' | 4' | 5' | 6' | 7' | 8' | 9' | 10' | 11' | 12' | 13' | 14' | 15' | 16 | 17 | 18 |
| 1–10 | o | | | | o | | o | | o | | | | o | | o | | | |
| 10–15 | | o | | o | | | o | | | | | | o | | o | | | |
| 15–20 | | o | | o | | | o | | | | | | | | | | | |
| 20–30 | | o | | o | | | o | | | | o | | | o | o | | | |
| 30–35 | | | o | | o | o | | | | | | | | | o | o | | |
| 35–40 | | | o | | o | o | | | | | | | | | | | | |
| 40–50 | | | o | | o | o | | | | | | o | | o | | | | o |
| 50–55 | o | | | | o | o | | | | | o | | | | | | | o |
| 55–60 | o | | | | o | o | | | | | | | | | | | | | o = open, otherwise closed.

Ambient air compressed to feed pressure (21 psia) by a feed blower 110' driven by motor 108' comprises the elevated feed gas mixture and enters through manifold 100' and open valve 1' into first Bed A', which has already been pressurized to adsorption pressure. Beds A', B' and C' are packed with adsorbent(s) selective for the removal of water, carbon dioxide, and nitrogen from air. Oxygen product is withdrawn via open valve 10' and manifold 104' to product reservoir 109'. Part of the product oxygen is removed through manifolds 105 and 103' and open valves 16 and 13' as purge gas for Bed B'. Energy is recovered from the purge gas stream as it passes through expander 113. Feed flow is discontinued after a predetermined time or as soon as nitrogen concentration in the effluent from Bed A' reaches a preset limit or the adsorption front approaches the bed outlet. Pressure in Bed A' is reduced by closing valves 1' and 10' and opening valves 16 and 13' and connecting Bed A' with Bed B' via manifolds 105 and 103'. Energy is recovered from the pressure equalization stream as it passes through expander 113. Bed A' is simultaneously depressured via open valve 2' and manifold 101' through vacuum pump 111'. The energy recovered from the cocurrent depressurization/ pressure equalization stream is used to reduce the power requirement of vacuum pump 112'. Valve 16 is closed and valve 2' remains opened until Bed A' reaches an evacuation level pressure ~7 psia. Valve 2' then closes and Bed A' continues evacuating to ~4 psia via open valve 3' and manifold 102' through vacuum pump 112'. Valve 3' is kept open for a predetermined time while valve 11' is opened to vacuum purge Bed A' through manifolds 103' and 105 with product oxygen from Bed C' via open valve 18. Valve 3' is then closed and valves 1', 11', and 18 are opened for simultaneous ambient feed air and Bed C' cocurrent depressurization gas repressurization through manifolds 100', 103', and 105, respectively. The energy recovered from the ambient feed air as it expands through the feed blower before entering the subatmospheric pressure of the adsorber, is used to reduce the power requirement for vacuum pump 112'. Valves 11' and 18 are kept open until the pressures in Beds A' and C' equalize. Then valves 11' and 18 close and Bed A' is pressurized up to adsorption pressure ~21 psia with elevated pressure feed air from manifold 100'. Valve 10' is opened to remove product oxygen through manifold 104'. Bed A' is now ready to start a new cycle. All three beds go through a similar sequence of operation 120 degrees out of phase with each other, in which Bed B' and associated valves 4', 5', 6', 12', 13' and 17, and Bed C' and associated valves 7', 8', 9', 14', 15' and 18. The feed blower 110', the vacuum pumps 111' and 112', and the expander 113 run continuously off the same motor shaft, allowing simplification of operation and transmission of recovered power.

Any adsorbent(s) which can selectively separate more strongly adsorbed components from less strongly adsorbed components of a particular feed gas mixture can be used, and the evaluation of such adsorbents for a particular feed gas mixture is well within the capability of those skilled in the art. In the preferred embodiment, an adsorbent that selectively removes water, carbon dioxide, and nitrogen from air include zeolitic molecular sieves such as NaX, NaA, LiX, MgA, CaX, CaA and other adsorbents with binary cations. Examples of adsorbents capable of removing water and carbon dioxide from air are aluminas, silica gels, and zeolites. Other desired properties of the adsorbents are (i) high crush strength, (ii) high attrition resistance, (iii) large bulk density, (iv) low interparticle void, (v) high heat capacity, (vi) large thermal conductivity, (vii) high $N_2/O_2$ selectivity, (viii) low oxygen capacity, and (ix) small particle size. Pressure drop through the adsorbent beds during adsorption and evacuation steps is also important for adsorbent selection.

EXAMPLE

The benefit of the Present Invention over oxygen VSA processes that do not have the power recovery and high adsorbent productivity features of the Present Invention can be seen in the comparison of the first preferred embodiment of the Present Invention with U.S. Pat. No. 5,429,666 and U.S. Pat. No. 5,411,578. All three processes were simulated, scaled up, and costed with the following parameters set for each process:

Plant Size=110 $TPD_c$
Product Purity=90% $O_2$
Feed Pressure=20.4 psia
Evacuation Pressure=4.9 psia
Evacuation Time=40–45 seconds per adsorber
Feed Temperature 90° F.
Adsorber Diameter=15 ft
Total Adsorbent Depth=7 ft
Adsorbents=NaX at the feed end followed by CaX zeolite.

The results of this comparison are set forth in Table 5 below which shows a lower adsorbent requirement and lower cost for oxygen in the Present Invention.

TABLE 5

|  | 5,429,666 | 5,411,578 | Present Invention |
| --- | --- | --- | --- |
| Oxygen Production, TPD | 110 | 110 | 110 |
| Number of Adsorbers | 4 | 4 | 3 |
| Number of Vacuum Pumps | 2 | 2 | 2 |
| Number of Feed Blowers | 1 or 2 | 1 | 1 |
| Product Surge Tank Volume, ft³ | 10,000 | 0 | 5,000 |
| Oxygen Recovery, % | 47 | 52 | 47 |
| Adsorbent Productivity, $\frac{TPD\ Oxygen}{ton\ adsorbent}$ | 1.37 | 1.42 | 1.89 |
| Air Blower Power, KW | 288 | 276 | 288 |
| Vacuum Blower, KW | 794 | 750 | 762 |
| Total Power, KW | 1082 | 1026 | 1050 |
| Relative Capital Cost | 1.0 | 0.98 | 0.89 |
| Relative $O_2$ Product Cost | 1.0 | 0.97 | 0.93 |

The Present Invention achieves this desirable lower cost of producing oxygen using three unique innovations. First, the utilization of two vacuum pumps in a 3 bed process allows an adsorber to be connected to a vacuum pump for two-thirds of the total cycle time (T). For a minimum practical evacuation time (E) of 40 seconds, this yields a minimum total cycle time of 60 seconds. By contrast, the minimum total cycle time for U.S. Pat. No. 5,429,666 and U.S. Pat. No. 5,411,578 (both of which have an adsorber connected to a vacuum pump for one-half of the total cycle time) is 80 seconds. The Present Invention has an inherent 33% advantage in minimum total cycle time, which translates directly to a 33% advantage in adsorbent productivity and adsorber/adsorbent related costs.

Second, by utilizing the vacuum pumps in a staged configuration (E1/E2), only one of the vacuum pumps (the E2 machine) needs to be the two-stage wet injected type (i.e., 112, 112'), typically employed in oxygen VSA's. The E1 machine evacuates the adsorber to a relatively shallow 7 psia and as such can be a single stage dry machine. For a given actual cubic feet per minute (ACFM) capacity, a single stage dry vacuum pump costs about ⅓ as much as a two stage wet machine.

Third, by exploiting opportunities for power recovery, the Present Invention is able to achieve power reductions of 2.5 to 5%. The first preferred embodiment does this very simply. By mounting both vacuum pumps and the air blower on a single motor shaft, power generated during the countercurrent depressurization of step 2 and ambient repressurization of step 6 can be directly transferred to the second vacuum pump to reduce its power consumption. No special energy recovery equipment is required, and the recoverable energy represents approximately 2.5% of the total process requirement. Approximately 5% of the total process power requirement is recovered in the second preferred embodiment. Additional capital equipment in the form of 3 valves and a dedicated expander are required to capture and utilize the pressure energy contained in the product purge and cocurrent DP streams. For a 110 TPD plant with 5 cent/KW power, the first preferred embodiment would be the most economic design. The second preferred embodiment would be more economic in a very large plant with expensive power.

The present invention can be used with a four bed process using three vacuum pumps. Each bed would spend 3T/4 of the total cycle time hooked to at least one of the vacuum pumps. In fact, each vacuum pump will be connected to a bed for T/4 of T time period. A bed will spend T/4 of the T on adsorption, repressurization steps.

The present invention has been set forth with regard to several illustrative preferred embodiments, but the full scope of the present invention should be ascertained from the claims below.

We claim:

1. A process for selectively separating a more strongly adsorbable component from a less strongly adsorbable component of a feed gas mixture, in a plurality of adsorption beds containing an adsorbent selective for the more strongly adsorbable component, utilizing at least two vacuum pumps, and comprising the steps of:
   (a) introducing a feed gas mixture at elevated pressure containing said more strongly adsorbable component and said less strongly adsorbable component into an inlet of a first adsorption bed containing said adsorbent selective for the more strongly adsorbable component and adsorbing said more strongly adsorbable component on said adsorbent while said less strongly adsorbable component passes through said first adsorption bed unadsorbed as a product and as a source of purge gas for a second adsorption bed of said plurality of adsorption beds undergoing purge of step (e) and continuing until the adsorption front of said more strongly adsorbable component approaches an outlet of said first adsorption bed and terminating the introduction of said feed gas mixture;
   (b) following the termination of the introduction of said feed gas mixture into said first adsorption bed, cocurrently depressurizing said first adsorption bed to an intermediate pressure to remove a cocurrent depressurization gas to an outlet of said second adsorption bed of said plurality of adsorption beds at lower pressure undergoing repressurizing of step (f) to at least partially pressure equalize the two beds, while countercurrently depressurizing said first adsorption bed by expanding elevated pressure gas in said first adsorption bed through a first vacuum pump to recover energy from said gas to reduce the power requirement for the countercurrent evacuation of step (d);
   (c) countercurrently evacuating said first adsorption bed through said first vacuum pump to remove a portion of said more strongly adsorbable component;
   (d) continuing to evacuate said first adsorption bed through a second vacuum pump to remove an additional portion of said more strongly adsorbable component;
   (e) countercurrently purging said first adsorption bed with a portion of said less strongly adsorbable component from a third adsorption bed of the plurality of adsorption beds undergoing step (a) to remove a final portion of the more strongly adsorbable component from said first adsorption bed;
   (f) repressurizing said first adsorption bed with said cocurrent depressurization gas from said third bed of the plurality of adsorption beds undergoing said cocurrently depressurizing of step (b), and with ambient pressure feed gas mixture which expands through a feed gas blower before entering said first adsorption bed wherein the energy recovered is used to reduce the power requirement to evacuate of step (d);
   (g) further repressurizing said first adsorption bed with said feed gas mixture at elevated pressure; and
   (h) performing steps (a) through (g) in each of the plurality of adsorption beds in a phased sequence.

2. The process of claim 1 wherein said first adsorption bed is simultaneously repressurized with said less strongly adsorbable component and said feed gas mixture at elevated pressure in step (g).

3. The process of claim 1 wherein the pressure equalization of step (b) is performed to complete equalization of the pressures in the two beds engaged in the pressure equalizing step.

4. The process of claim 1 wherein said two vacuum pumps and said feed gas blower are mounted on a single motor shaft for the transmission of recovered power.

5. The process of claim 1 wherein said feed gas blower is a positive displacement Roots type blower.

6. The process of claim 1 wherein said first vacuum pump is a single stage positive displacement Roots type blower.

7. The process of claim 1 wherein said second vacuum pump is a two stage, water injected positive displacement Roots type blower.

8. The process of claim 1 wherein said second vacuum pump is a centrifugal type machine.

9. The process of claim 1 wherein said plurality of adsorption beds is three adsorption beds.

10. The process of claim 1 wherein said purge gas is expanded through an expander to recover energy to reduce the power requirement of the adsorption bed undergoing countercurrent purge of step (e).

11. The process of claim 1 wherein said cocurrent depressurization gas is expanded through an expander to recover energy to reduce the power requirement of the adsorption bed undergoing the countercurrent evacuation of step (d).

12. A process for selectively separating nitrogen from oxygen in air, utilizing two vacuum pumps and three adsorption beds containing an adsorbent selective for nitrogen, comprising the steps of:
   (a) introducing feed air at elevated pressure into an inlet of a first adsorption bed containing said adsorbent selective for nitrogen and adsorbing nitrogen on said adsorbent while oxygen passes through said first adsorption bed unadsorbed as a product and as a source of purge gas for a second adsorption bed undergoing the purge of step (e), until the adsorption front of nitrogen approaches an outlet of said first adsorption bed and terminating the introduction of said feed air into said first adsorption bed;
   (b) following the termination of the introduction of said feed air into said first adsorption bed, cocurrently depressurizing said first adsorption bed to remove a cocurrent depressurization gas from said first adsorption bed and passing said cocurrent depressurization gas to the outlet of said second adsorption bed at lower pressure undergoing repressurizing of step (f) to at least partially pressure equalize said first adsorption bed and said second adsorption bed, while countercurrently depressurizing said first adsorption bed by expanding elevated pressure nitrogen in said first adsorption bed through a first vacuum pump to recover energy from said nitrogen to reduce the power requirement for the countercurrent evacuation of step (d);

(c) countercurrently evacuating said first adsorption bed through said first vacuum pump to remove a portion of said nitrogen from said first adsorption bed;

(d) continuing to evacuate said first adsorption bed through a second vacuum pump to remove an additional portion of said nitrogen;

(e) countercurrently purging said first adsorption bed with oxygen from said second adsorption bed undergoing step (a) to remove a final portion of said nitrogen from said first adsorption bed;

(f) repressurizing said first adsorption bed with cocurrent depressurization gas from a third adsorption bed at higher pressure undergoing the cocurrent depressurization of step (b) and with ambient pressure feed gas which expands through a feed gas blower before said first adsorption bed wherein the energy recovered reduces the power for the countercurrent evacuation of step (d);

(g) further repressurizing said first adsorption bed with said feed air at elevated pressure; and (h) performing steps (a) through (g) in each of said three adsorption beds in a phased sequence.

13. The process of claim 12 wherein said first adsorption bed is repressurized in step (g) with oxygen and said feed air at elevated pressure simultaneously.

14. The process of claim 12 wherein said feed air at elevated pressure is at a pressure in the range of approximately 15–30 psia.

15. The process of claim 12 wherein said feed air at elevated pressure is at a pressure in the range of approximately 15–24 psia.

16. The process of claim 12 wherein at the end of said countercurrently evacuating of step (c) said first adsorption bed is at a pressure in the range of approximately 6–10 psia.

17. The process of claim 12 wherein at the end of step (d) to evacuate, said first adsorption bed is at a pressure in the range of approximately 1–7 psia.

18. The process of claim 12 wherein said pressure equalize of step (b) is performed to complete equalization of the pressures in the two beds engaged in the pressure equalizing step.

* * * * *